(12) United States Patent
Quiring et al.

(10) Patent No.: US 10,107,258 B2
(45) Date of Patent: Oct. 23, 2018

(54) WIND TURBINE BLADE FOR A ROTOR OF A WIND TURBINE

(75) Inventors: Peter Quiring, Rodding (DK); Rocco Prete, Kolding (DK); Torben Lindby, Gesten (DK)

(73) Assignee: LM GLASFIBER A/S, Kolding (DK)

( * ) Notice: Subject to any disclaimer, the term of this patent is extended or adjusted under 35 U.S.C. 154(b) by 1369 days.

(21) Appl. No.: 13/807,486

(22) PCT Filed: Jul. 1, 2011

(86) PCT No.: PCT/EP2011/061127
§ 371 (c)(1),
(2), (4) Date: Dec. 28, 2012

(87) PCT Pub. No.: WO2012/001147
PCT Pub. Date: Jan. 5, 2012

(65) Prior Publication Data
US 2013/0108455 A1    May 2, 2013

(30) Foreign Application Priority Data
Jul. 1, 2010 (EP) .................................... 10168064

(51) Int. Cl.
*F03D 1/06* (2006.01)
*B21D 53/78* (2006.01)

(52) U.S. Cl.
CPC .......... *F03D 1/0683* (2013.01); *B21D 53/78* (2013.01); *F03D 1/0641* (2013.01);
(Continued)

(58) Field of Classification Search
CPC .... F03D 1/0683; F03D 1/0641; F03D 1/0675; B21D 53/78; Y10T 29/49339; Y02E 10/721
(Continued)

(56) References Cited

U.S. PATENT DOCUMENTS 7,811,063 B2   10/2010  Bonnet
7,942,637 B2    5/2011  Akhtar et al.
(Continued)

FOREIGN PATENT DOCUMENTS

DE    4225599 A1   2/1994
EP    1310351 A1   5/2003
(Continued)

*Primary Examiner* — Aaron R Eastman
(74) *Attorney, Agent, or Firm* — Nath, Goldberg & Meyer; Jerald L. Meyer; Tanya E. Harkins (57) ABSTRACT

A wind turbine blade comprises a profiled contour having a pressure side and a suction side, a leading edge and a trailing edge with a chord extending between the leading edge and the trailing edge. The profiled contour generating a lift when being impacted by an incident airflow is formed by a hollow shell body. The hollow shell body is formed by at least a first shell body part and a second shell body part, which are mutually connected at least at the trailing edge and/or the leading edge. An edge stiffener is arranged within the hollow shell body at a first part of the edges, a first surface part of the edge stiffener being connected to an inner side of the first shell body part, and a second surface part of the edge stiffener being connected to an inner side of the second shell body part.

20 Claims, 10 Drawing Sheets

(52) U.S. Cl.
CPC .......... *F03D 1/0675* (2013.01); *Y02E 10/721* (2013.01); *Y10T 29/49339* (2015.01)

(58) Field of Classification Search
USPC ........................................................ 416/123
See application file for complete search history.

(56) References Cited

U.S. PATENT DOCUMENTS

| | | | |
|---|---|---|---|
| 2003/0116262 A1* | 6/2003 | Stiesdal | B29C 70/443 156/245 |
| 2008/0107540 A1* | 5/2008 | Bonnet | F03D 1/0675 416/229 R |
| 2009/0068017 A1* | 3/2009 | Rudling | F03D 1/0675 416/219 R |
| 2009/0273111 A1 | 11/2009 | Bansal | |
| 2009/0290982 A1* | 11/2009 | Madsen | F03D 1/0633 416/61 |
| 2010/0143146 A1* | 6/2010 | Bell | F03D 1/06 416/233 |
| 2010/0143147 A1 | 6/2010 | Akhtar et al. | |

FOREIGN PATENT DOCUMENTS

| | | |
|---|---|---|
| EP | 2119909 A1 | 11/2009 |
| GB | 2062120 A | 5/1991 |
| NL | 9100816 A | 12/1992 |
| WO | 2008/003330 A1 | 1/2008 |

\* cited by examiner

WIND TURBINE BLADE FOR A ROTOR OF A WIND TURBINE

This is a National Phase Application filed under 35 U.S.C. 371 as a national stage of PCT/EP2011/061127, filed Jul. 1, 2011, and this application also claims the benefit of the European patent Application No.: 10168064.3, filed Jul. 1, 2010, the content of each of the above prior applications is hereby incorporated by reference in its entirety.

TECHNICAL FIELD

The present invention relates to a wind turbine blade for a rotor of a wind turbine having a substantially horizontal rotor shaft, the rotor comprising a hub from which the blade extends substantially in a radial direction when mounted to the hub, wherein the blade comprises:

a profiled contour comprising a pressure side and a suction side, a leading edge and a trailing edge with a chord extending between the leading edge and the trailing edge, the profiled contour generating a lift when being impacted by an incident airflow, wherein said profiled contour is formed by a hollow shell body, wherein the hollow shell body is formed by at least a first shell body part and a second shell body part, which are mutually connected, at least at the trailing edge and the leading edge.

The invention also relates to a method of manufacturing a wind turbine blade provided with an elongated, longitudinally extending and prefabricated edge stiffener, wherein the method comprises the steps of i) arranging the edge stiffener at a first part of a hollow shell body edge of a wind turbine blade, ii) providing said edge with a binder, e.g. glue, and iii) applying a force to the edge stiffener during curing of the binder and pressing the edge stiffener towards the first part of the edge and an inner wall side of the hollow shell body.

BACKGROUND

A wind turbine blade of the airfoil type is shaped like a typical airplane wing, where the cord plane width of the blade increases continuously with decreasing distance from the hub. This might result in problems when mounting the blade to the hub and, furthermore, it causes great loads during operation of the blade due to the large surface area of the blade. Over the years, the construction of the blades has developed towards a shape, where the blades comprise a root region close to the hub, an airfoil region comprising a lift generating profile furthest away from the hub, and a transition region between the root region and the airfoil region. The transition region has a shape changing gradually from the circular shape of the root region to an airfoil profile of the airfoil region. Typically, the width of the blade in the transition region increases substantially linearly with increasing distance from the hub.

During the operating of a wind turbine, there is a risk that the blades will buckle due to the forces applied to the blades, when they rotate, and specifically in the region where the edges are bonded together. Especially in regions where the leading edge and the trailing edge are glued, there is a risk of stress concentration, and the risk of fracture is quite high. Further, the risk of fracture is increasing when the size of the blades increases. By the standard size of wind turbine blades, the problem is typically solved by placing several layers of balsa wood in the shells in order to strengthen the blade. When the number of layers of balsa wood or foam increases, the weight and costs of the blade will increase correspondingly. Further, the balsa wood or the foam will also absorb resin, which will contribute significantly to the weight of the blade and also to the production costs. For large-size blades, an extra web/beam reinforcement running from the inner side of the shells might even be incorporated, said web/beam obviously increasing the production complexity making it more expensive and also contributing to an increased weight of the blade.

EP 1310351 provides a method for making wind turbine blades in one piece without any glue joints. The problems disclosed in the prior art when using glue joints are inter alia problems with tolerances of the glue joint dimensions and difficulties with subsequent inspection of the quality of the glue joint. However, glue joints or similar bonding possibilities are necessary steps when the blades are manufactured by at least two shell parts and connected to each other in a trailing edge and a leading edge, where at least one of the edges, or at least a part of one of the edges, is applied a binder or similar adhering material on one of the shell parts.

US 2009/0068017A1 discloses a wind turbine blade comprising a spar connected to a root sub-assembly. The spar supports frame members of fibre-reinforced plastic and shaped to largely correspond to the cross-sectional profile of the blade. Skin panels of fibre-reinforced plastic are mounted on the frame members to form the outer surface of the blade. The frame members have less longitudinal extent than transverse extent and are arranged with considerable spacing.

WO 2008/003330 A1 discloses a wind turbine blade assembled by gluing an upper and a lower part of the blade together in the vicinity of the trailing edge of the blade. The upper and lower parts are attached to a U-shaped or C-shaped assembly element at the trailing edge. A deformable trailing edge section is connected to the assembly element.

EP 2119909A1 discloses a wind turbine blade formed by two longitudinally extending and mutually joined blade sections. The blade sections are joined by means of a central insert and by means of inserts at the leading and trailing edge.

DE 4225599 discloses a wind turbine blade comprising a suction side plate and a pressure side plate mutually connected at a trailing edge of the blade through a profiled member.

NL 9100816 discloses a method for assembling and reinforcing a hollow structure formed of shell halves, such as a wind turbine blade formed of two shell halves, and wherein the shell halves are assembled together with a polymer-impregnated fibre layer wrapped around an inflatable bag arranged between them, whereafter the fibre layer is pressed against the inside surfaces of the shell halves by inflating the bag. The pressure is maintained until the polymer has hardened and the shell halves thus being assembled. The bag can be filled with a foam material while being under pressure.

DISCLOSURE OF THE INVENTION

It is an object of the invention to obtain a new blade construction overcoming at least one of the disadvantages of the prior art or providing at least a useful alternative.

According to a first aspect of the invention, a wind turbine blade as described in the introduction is provided, wherein an edge stiffener is arranged within the hollow shell body at a first part of the edges, wherein a first surface part of the edge stiffener is connected to an inner side of the first shell body part, and a second surface part of the edge stiffener is connected to an inner side of the second shell body part. In this way, the risk of buckling of the wings is reduced. Further, the stiffener will also limit the need for other stiffening elements, such as balsa wood, and in this way, the weight of the blade may be reduced. Further, as the amount of balsa tree is reduced, the absorption of resin into the balsa wood will decrease, which also contributes to a decrease in the weight of the blades. The connection may be achieved by using glue or other bonding agents.

By a first part of the edges is to be understood: at least a portion of at least the trailing edge or the leading edge or both.

In a second embodiment of the invention, the edge stiffener is prefabricated. By prefabricated is to be understood that the stiffener is manufactured separately and independently of the manufacturing of the shell parts.

In a third embodiment of the invention, the edge stiffener further comprises fibre protrusions for connecting to the inner side of the hollow shell body. In this way, the stiffness of the edge stiffener is increased and, further, the construction contributes to the stiffener being bonded to the inside of the blade in a more secured way.

In an advantageous embodiment, the edge stiffener is pre-shaped to follow a contour of the leading edge and/or the trailing edge of the blade.

In a fourth embodiment of the invention, the first part of the edges comprises at least a part of the trailing edge.

This is the part of the blade, in which a very good effect is obtained regardless of the size of the blade.

In a fifth embodiment of the invention, the first part of the edges comprises at least a part of the leading edge. It is a particularly advantageous to place the edge stiffener at the leading edge when the blade is a very long blade, i.e. blades having a length of 40 meters or more, or even 50 or 60 meters or more.

In a sixth embodiment of the invention, the profiled contour is divided in the radial direction into a root region with a substantially circular or elliptical profile closest to the hub, an airfoil region with a lift generating profile furthest away from the hub, and preferably a transition region between the root region and the airfoil region, the transition region having a profile changing gradually in the radial direction from the circular or elliptical profile of the root region to the lift generating profile of the airfoil region.

In a seventh embodiment of the invention, the edge stiffener is placed in a preferably continuous piece in at least a part of the transition region of the blade and at least part of the airfoil region of the blades. It is particularly effective to arrange the edge stiffener here in order to limit buckling effects.

In an eighth embodiment of the invention, the edge stiffener comprises a fibre-reinforced material such as glass fibre.

In a ninth embodiment of the invention, the edge stiffener further comprises a core material wrapped in the fibre-reinforced material, said fibres surrounding the core material such as foamed polymer or balsa wood. In this way, a sufficient stiffness is obtained and at the same time the stiffener is not too heavy.

In a tenth embodiment of the invention, the mass ratio between the fibre material and core material varies in radial direction of the blade.

In an eleventh embodiment of the invention, the edge stiffener comprises a fibre-reinforced material in a region closest to the tip, said region advantageously having a longitudinally extent of 1-3 m. Consequently, the core with wrapped fibre material is only located in the part nearest the root.

In a twelfth embodiment of the invention, the outer contour of the edge stiffener is substantially congruent with the inner contour of the hollow shell body and the edge, at which the edge stiffener is placed at to which it is bonded. In this way, the amount of glue used is reduced.

In a thirteenth embodiment of the invention, the method comprises the steps of:

i) arranging the edge stiffener at a first part of an edge of a hollow shell body of a wind turbine blade, ii) providing said edge with a binder, e.g. glue, and iii) applying a force to the edge stiffener during curing of the binder and pressing the edge stiffener towards the first part of the edge and an inner wall side of the hollow shell body.

In a fourteenth embodiment of the invention, the blade is manufactured by the following manufacturing steps:

a) providing a first shell part being a pressure side shell part, b) providing a second shell part being a suction side shell part, c) assembling the hollow shell body by connecting the first shell part to the second shell part, d) connecting a first surface of the edge stiffener to an inner part of the first shell part, and e) connecting a second surface of the edge stiffener to an inner part of the second shell part.

In a fifteenth embodiment of the invention, the use of manufacturing a wind turbine blade is described.

In a sixteenth embodiment of the invention, the fibre material comprises steel, aramid or plant fibres.

In a seventeenth embodiment of the invention, the edge stiffener comprises glass fibres and foamed polymer in the transition region.

In an eighteenth embodiment of the invention, the length of the edge stiffener is at least 5 meters, such as 5-15 meters, 7-12 meters, or 8-10 meters.

In a nineteenth embodiment of the invention, the first shell body part forms the pressure side of the blade, and the second shell body part forms the suction side of the blade.

In a twentieth embodiment of the invention, the first shell body part and the second shell body part are adhered together at the trailing edge of the blade by a binder such as glue.

In a twenty-first embodiment of the invention, the first shell body part and the second shell body part are further adhered to each other at the leading edge of the blade by a binder such as glue.

In a twenty-second embodiment of the invention, the edge stiffener comprises a core material wrapped in a fibre-reinforced material and further comprises a part made of a fibre-reinforced material.

In a twenty-third embodiment of the invention, the edge stiffener comprises a core material wrapped in a fibre-reinforced material and placed in the transition region of the blade and further comprises a part made of a fibre-reinforced material and placed in the airfoil region.

In a twenty-fourth embodiment of the invention, the cross-sectional area of the core part decreases in a radial direction of the blade.

In a twenty-fifth embodiment of the invention, the first shell body part and the second shell body part are formed in a fibre-reinforced polymer material.

In a twenty-sixth embodiment of the invention, the outer contour of the edge stiffener is C or U-formed in a cross section.

In a twenty-seventh embodiment of the invention, the edge stiffener is a longitudinally extending element, preferably elongated, extending along the leading edge and/or the trailing edge of the blade.

BRIEF DESCRIPTION OF THE DRAWING(S)

The invention is explained in detail below with reference to the drawing(s), in which.

DETAILED DESCRIPTION OF THE INVENTION

Figure 1:
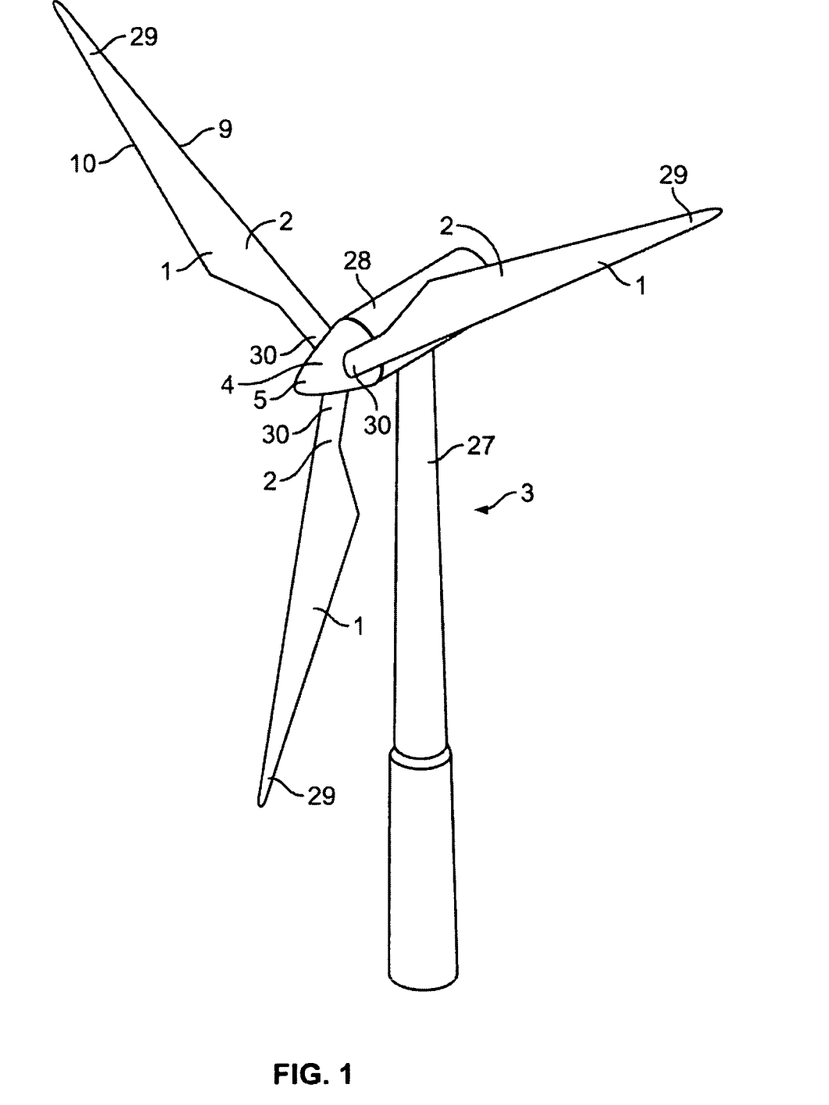
FIG. 1 shows a wind turbine.

FIG. 1 illustrates a conventional, modern upwind wind turbine according to the so-called "Danish concept" with a tower 27, a nacelle 28 and a rotor 2 with a substantially horizontal rotor shaft 4. The rotor 2 includes a hub 5 and three blades 1 extending radially from the hub 5, each having a blade root 30 nearest the hub, and a blade tip 29 furthest from the hub 5.

Figure 3:
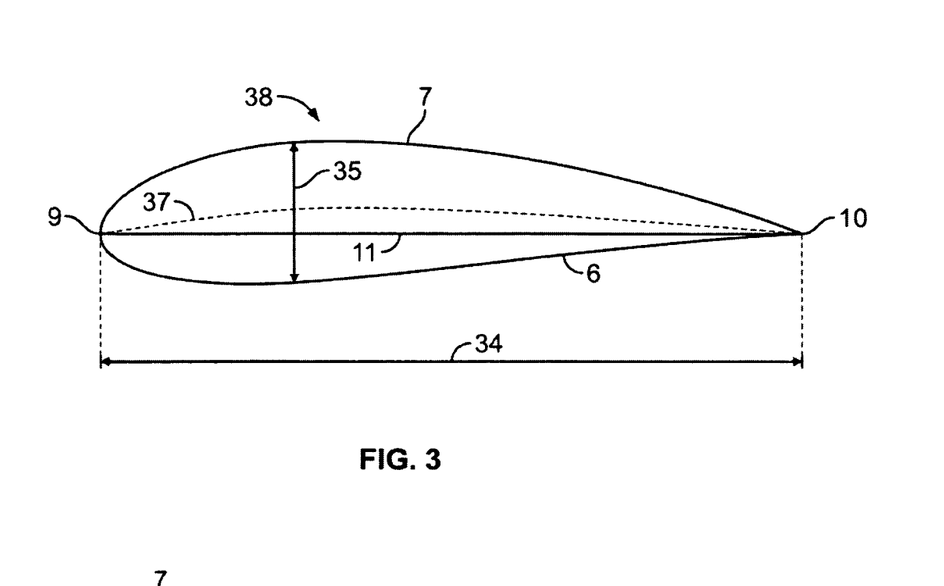
FIG. 3 shows a schematic view of an airfoil profile.

FIG. 3 shows a schematic view of an airfoil profile 38 of a typical blade of a wind turbine depicted with the various parameters, which are typically used to define the geometrical shape of an airfoil. The airfoil profile 38 has a pressure side 6 and a suction side 7, which during use, i.e. during rotation of the rotor, normally face towards the windward side and the rearward side, respectively. The airfoil 38 has a chord 11 with a chord length 34 extending between a leading edge 9 and a trailing edge 10 of the blade. The airfoil 38 has a thickness 35, which is defined as a distance between the pressure side 6 and the suction side 7. The thickness 35 of the airfoil varies along the chord 11.

Figure 2:
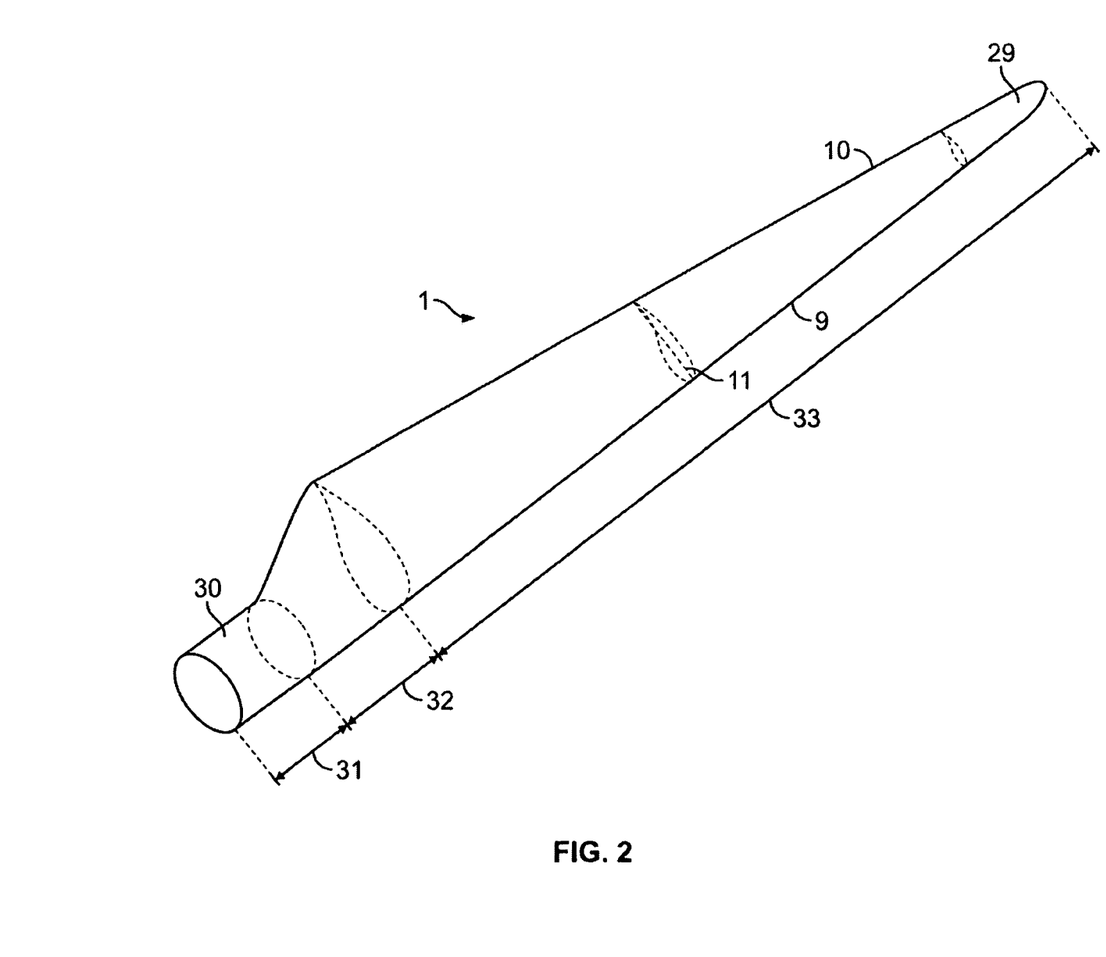
FIG. 2 shows a perspective view of a conventional blade.

As seen from FIG. 2, the conventional blade 1 comprises a root area 31 closest to the hub, an airfoil area 33 furthest away from the hub, and a transition area 32 between the root area 31 and the airfoil area 33. The blade 1 comprises the leading edge 9 facing the direction of rotation of the blade 1, when the blade is mounted on the hub, and the trailing edge 6 facing in the opposite direction to the leading edge 9. The airfoil area 33 has an ideal or almost ideal blade shape, whereas the root area 31 has a substantially, circular cross section, which reduces storm loads and makes it easy and safe to mount the blade 1 to the hub. Advantageously, the diameter of the root area 31 is constant along the entire root area 31. The transition area 32 has a shape changing gradually from the circular shape of the root area 31 to the airfoil profile of the airfoil area 33. The width of the transition area 32 increases substantially linearly with the increasing distance from the hub.

The airfoil area 33 has an airfoil profile with a chord plane 11 extending between the leading edge 9 and the trailing edge 10 of the blade 1. The width of the chord plane decreases with increasing distance L from the root area 31. It should be noted that the core plane does not necessarily run straight over its entire extent since the blade may be twisted and/or curved thus providing a chord plane with a correspondingly twisted and/or curved course. Most often, this is the case in order to compensate for the local velocity of the blade being dependent on the radius from the hub. Due to the circular cross section, the root area 31 does not contribute to the production of the wind turbine and, in fact, lowers the production a little due to the wind resistance.

Figure 4:
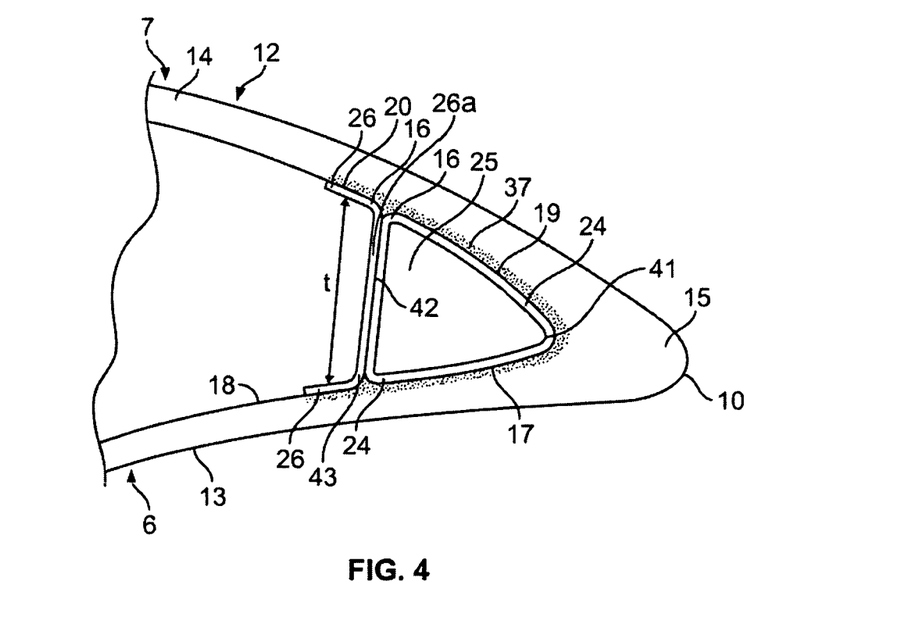
FIG. 4 shows a cross section of an edge comprising an edge stiffener according to the invention.

FIG. 4 shows a cross section of a part of a hollow shell body 12. The shell body 12 comprises a first shell body part 13, being the pressure side 6, and a second shell body 14, being the suction side 7, said shell body parts being connected at an edge, which is the leading edge and the trailing edge. A first part of the edges 15 is shown, and in this case, the first part of the edges is the trailing edge 10. Between the shell bodies, an edge stiffener 16 is placed.

The edge stiffener 16 comprises a core part 25, which could be made in foamed polymer or balsa wood, said core being wrapped with a fibre-reinforced material 24, especially resin-impregnated fibres. Advantageously, the fibres are glass fibres but could also be steel or carbon fibres. In this way, the core material is completely covered by the fibres ensuring that the edge stiffener is very stiff. The edge stiffener has a first surface part 17 and an opposing second surface part 19, said surfaces 17,19 adhering to the inner side of the first side of the first shell body part 18 and to the inner side of the second shell body part 20. Advantageously, the edge stiffener is bonded to the inner sides by glue 37. The edge stiffener is an elongated element extending along the leading edge and/or the trailing edge of the blade. Beneficially, the outer contour is U or C-shaped in a cross section, the legs of the C or U-form following and bonded to the inner sides of the shell.

The two sides of the edge stiffener are joined in an edge part 41 which is placed abutting to the inner side of the trailing edge 10. It could also be placed abutting to the inner side of the leading edge. Opposite the edge part 41, the two opposing sides of the edge stiffener—the first surface part 17 of the edge stiffener and the second surface part 19 of the edge stiffener—are connected by a third surface part 42 being substantially flat. C or U-formed fibre reinforcement 43 is placed/connected in cross section to this third surface part 42. The reinforcement being a part of the edge stiffener comprises protrusions 26 made of fibre material, these fibre protrusions also following the inner side of the hollow shell body 12. The protrusions are connected to each other by a connecting part 26a also made of fibre material and abutting onto the third surface part 42 and connected/bonded to this.

The outer contour of the edge stiffener is congruent with the inner contour of the hollow shell body and the edge 10 by which construction the amount of glue binding the edge stiffener to the inner side of the hollow shell body 12 might be reduced.

The terminal surface of the protrusions 26 of the edge stiffener 16 will protrude about 4-8 cm measured from the third surface part 42 of the wrapped edge stiffener. The protrusion part 26 will normally end a certain distance from where a shell stiffener such as balsa wood or similar material is placed in the shells. The distance is approximately 4-6 cm. The length of the third surface part measured between the first surface of the edge stiffener 17 and the second surface part of the edge stiffener 19 is 3-20 cm, depending on where the stiffener 16 is placed in the regions of the blade. The part of the edge stiffener 16 in the direction of the tip of the blade will have less core material 25, such as foamed polymer, incorporated compared to the part closest to the root area, and for the part of the edge stiffener 16 nearest the tip of the blade there will be no core material at all, the edge stiffener only comprising fibre-reinforced material. This is due to the fact that the space between the first shell body 13 and the second shell body 14, specifically in the trailing edge area nearest the tip of the blade, is very narrow, and that there is only sufficient space for the reinforcing material and no need for a core material at all.

In FIG. 4 the first part of the edges 15 comprises a part of the trailing edge 10, but could also comprise a part of the leading edge 9, said edge having such an edge stiffener 16 incorporated. It is specifically advantageous to incorporate an edge stiffener in the leading edge when the blade is a very large blade in order to avoid the buckling. The edge stiffener is specifically used in relatively thick parts of the blade, i.e. in the transition region of the blade and part of the profiled/airfoil region nearest the transition area. Preferably, the length of the edge stiffener is 5-15 m, preferably 7-12 m, and more preferably 8-10 m. The part of the edge stiffener that only comprises fibre-reinforced material is in the interval of 1-3 m depending on the length of the blade.

For a blade length of about 55 m the edge stiffener will have its starting point about 9 m away from the root and end about 18 m away from the root in radial direction. The first portion of the edge stiffener 16 nearest the root comprises a core made of a material such as foamed polymer and wrapped in reinforcing fibres such as glass fibre while a second portion of the edge stiffener in the far end of the blade only comprises reinforced fibre material. The length of this second portion is approximately 3 m. The ratio between the blade length and the length of the edge stiffener is advantageously between 4 and 8 more advantageously between 5 and 7.

Figure 5:
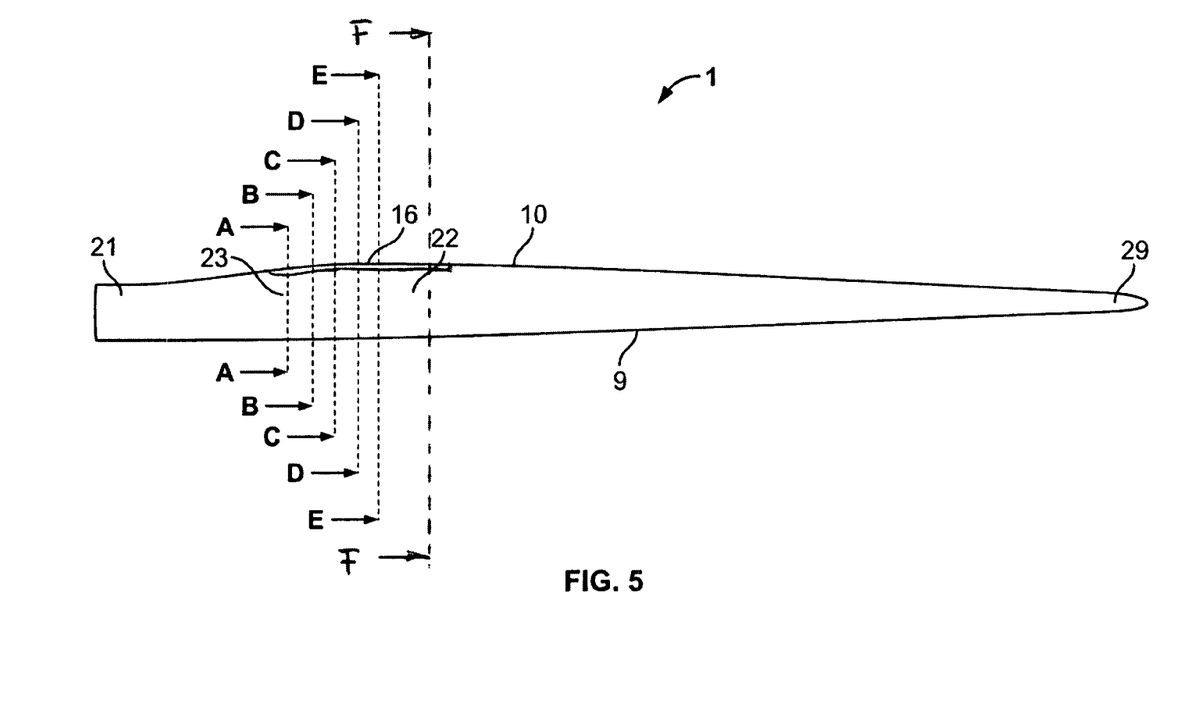
FIG. 5 shows a perspective view of a blade with an edge stiffener incorporated.
Figure 5A:
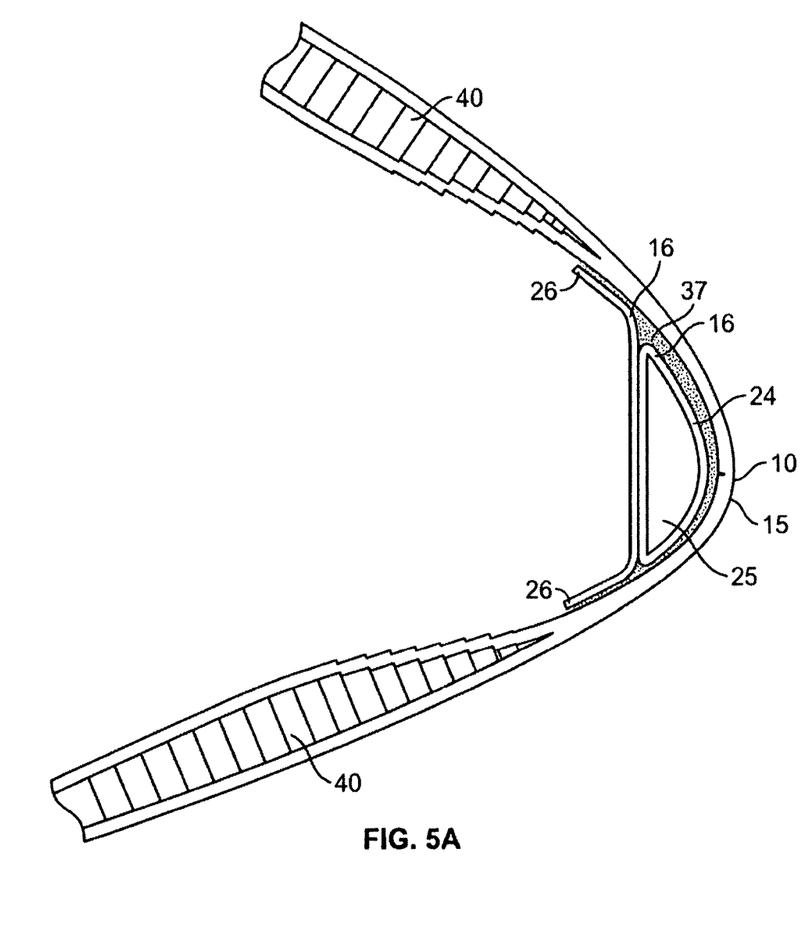
FIG. 5a shows a section along the line aa of FIG. 5.
Figure 5B:
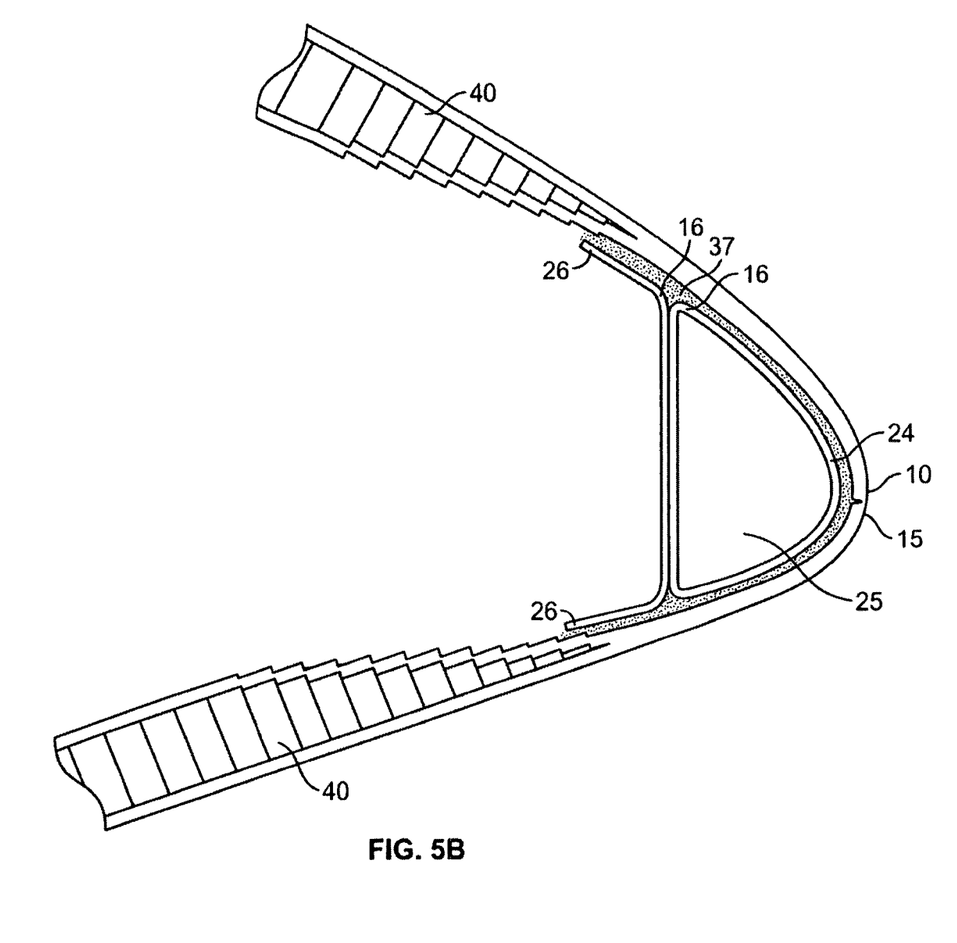
FIG. 5b shows a section along the line bb of FIG. 5.
Figure 5C:
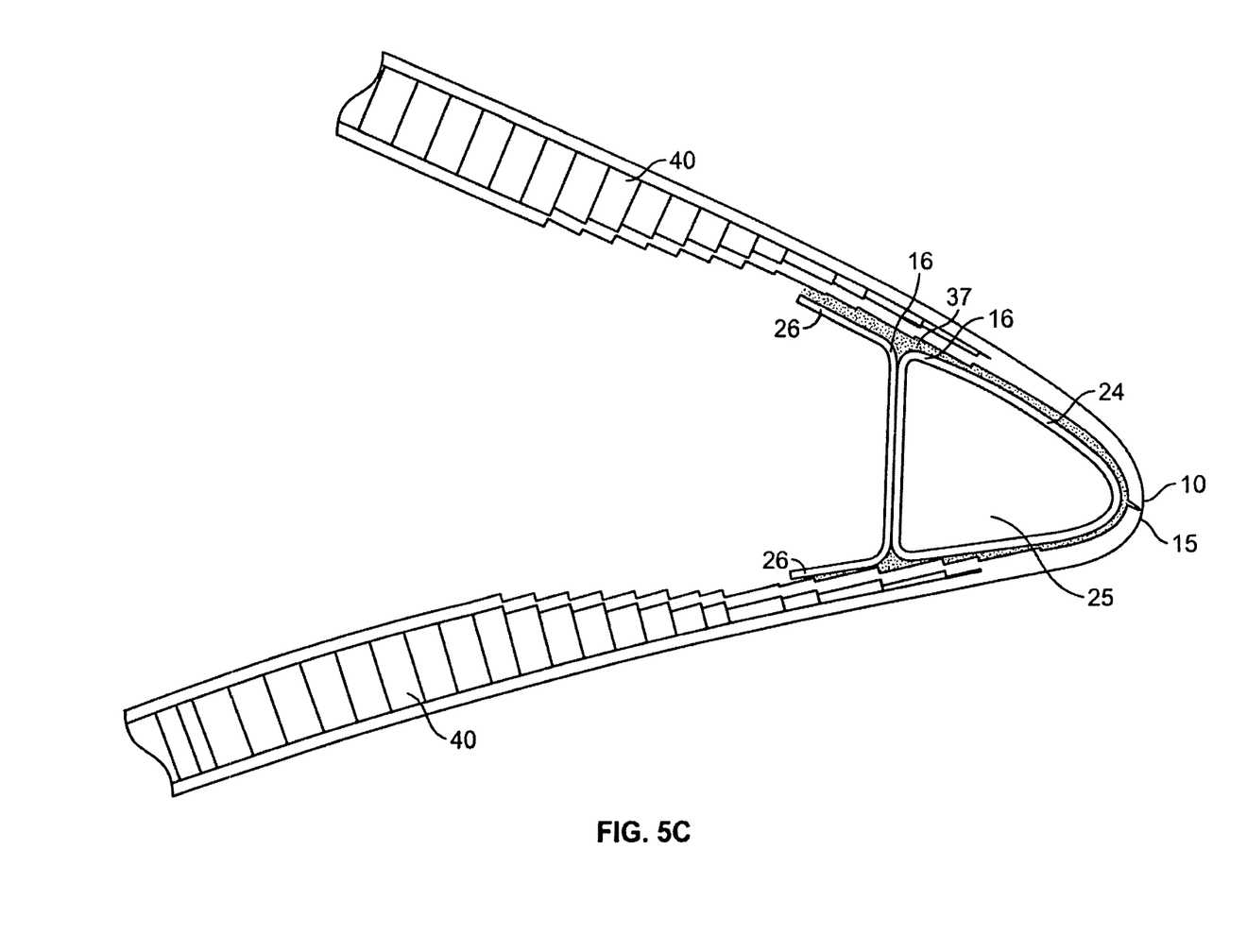
FIG. 5c shows a section along the line cc of FIG. 5.
Figure 5D:
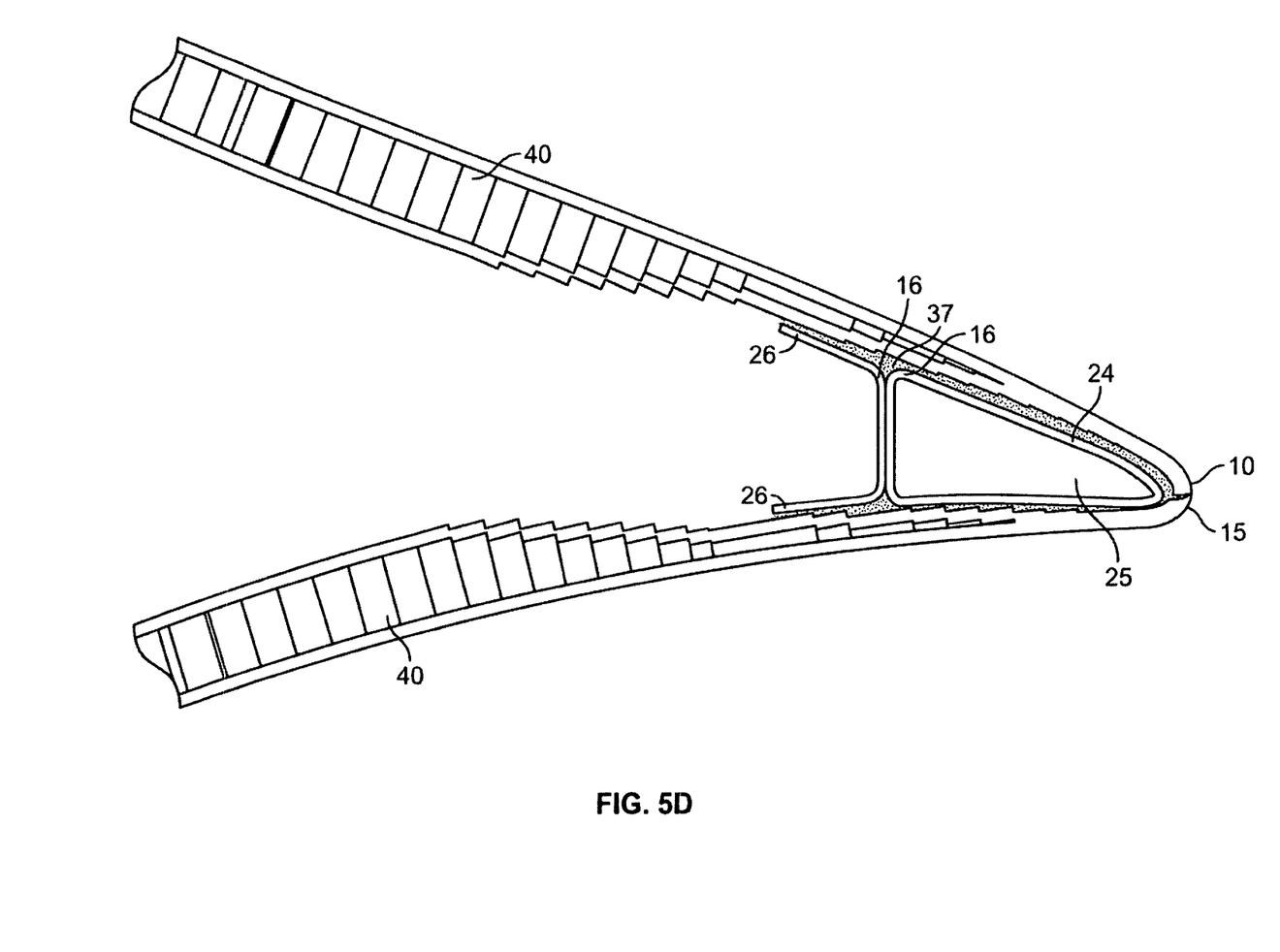
FIG. 5d shows a section along the line dd of FIG. 5.
Figure 5E:
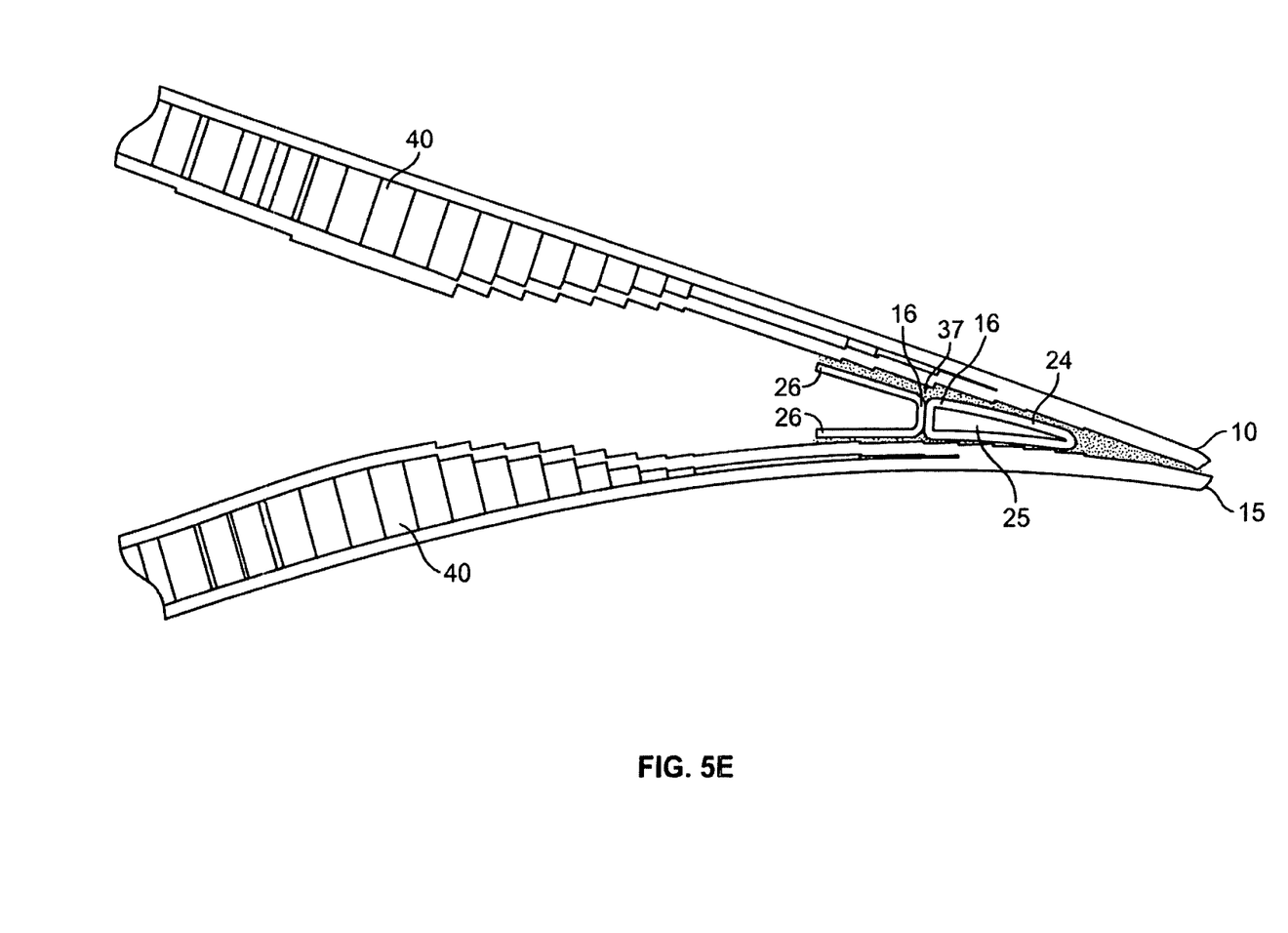
FIG. 5e shows a section along the line ee of FIG. 5.
Figure 5F:
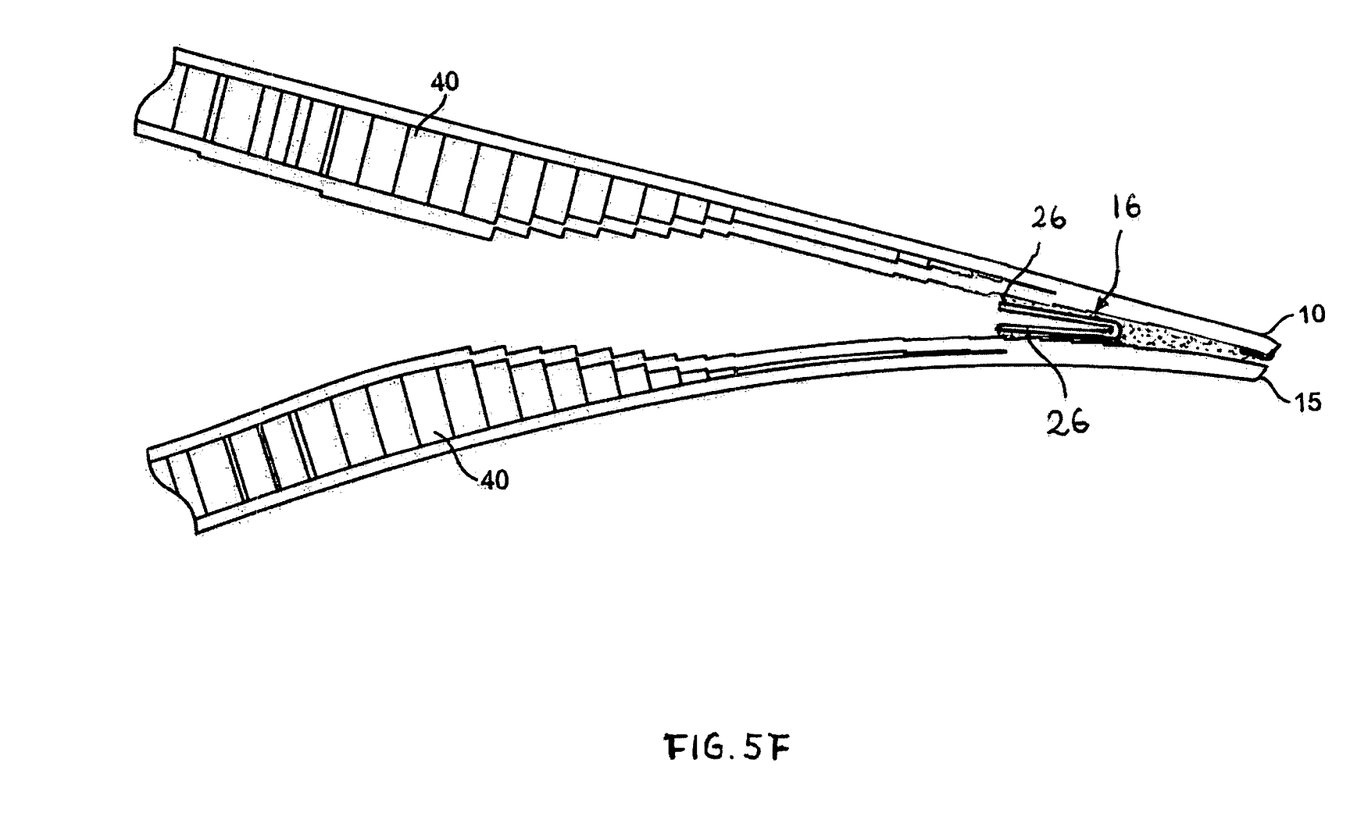
FIG. 5f shows a section along the line ff of FIG. 5.

FIG. 5 shows a view of a blade 1 with an edge stiffener 16 incorporated. The edge stiffener 16 is placed in the transition region 23 and also partly in the airfoil region 22. The profile contour in the radial direction is, as explained above, divided into a root region 21 that is circular or elliptical in profile closest to the hub. This is followed by an airfoil region with a lift generating profile furthest away from the hub, and between these two regions, a transition region 23 is placed, said region gradually changing in a radial direction from the circular or elliptical profile of the root region 21 to the lift generating profile of the airfoil region 22. The edge stiffener is, as explained above, placed in the transition and airfoil region and follows the edge in the trailing edge 10. In this case, the edge stiffener may first of all reduce the risk of buckling. Actually, such a stiffener may have the same effect as 25 mm extra trailing edge balsa wood. In this way, the incorporated edge stiffener reduces the weight considerably and speeds up the production process. The improvement is due to the considerably increased stiffness of the trailing edge joint. Further, in some cases, especially for large blades, this edge stiffener could also substitute a third web-reinforcement placed between the first and the second shell part, and in this way reduce the production complexity related to such a web. Further, the edge stiffener could also be placed in the leading edge.

FIGS. 5a-5f show different cross sections of FIG. 5 from which it is evident that the volume and geometry of the cross section of the core part is changing as a function of the inner contour of the shell. The part of the edge stiffener 16 being closest to the tip of the blade will have no core material at all and will only comprise fibre-reinforced material. This is clearly evident from FIG. 5f disclosing a sectional view along the line ff in FIG. 5, i.e in a part of the edge stiffener comprising fibre-reinforced material only. At a certain distance from the tip, the edge stiffener will comprise the core part and the cross sectional area of the core part will then change as a function of the distance between the shell parts of the hollow shell body 12. The cross sectional area of the core part will decrease in the radial direction of the blade. The first shell body part 13 and the second shell body part 14 are reinforced by balsa wood or foamed polymer 40 incorporated in the walls.

The edge stiffener 16 is normally a pre-fabricated elongated element and placed in the one shell body part. The first surface 17 of the edge stiffener is then adhered to the inner part of the first shell body part 13, and the second surface 19 of the edge stiffener 16 is then adhered to the inner part of the second shell body part 14. A force is applied to the edge stiffener 16. This could be done by incorporating a piece of rope several places in the edge stiffener and with a free rope end sticking out from the edge part of the edge stiffener. The rope end is then led through a hole in the shell or the first part of the edge 15, and a force is applied as long as the glue is curing. After the curing has taken place, the rope is cut off, and the surface of the blade is finished. Obviously, there will be several rope sections that should be cut off.

The force could also be applied by incorporating a recess or a shelf in the inner sides of the first and second shell body parts and in which the prefabricated edge stiffener is pressed into and kept in place during the curing of the binder/glue.

Finally, it should be noted that although an edge stiffener formed as a single continuous piece has been shown and described, the edge stiffener can also be formed of a number of longitudinally and adjacently arranged modulus which together form the edge stiffener having the described and claimed features.

LIST OF REFERENCES 1 blade
2 rotor
3 wind turbine
4 rotor shaft
5 hub
6 pressure side
7 suction side
8 profiled contour
9 leading edge
10 trailing edge
11 chord
12 hollow shell body
13 first shell body part
14 second shell body part
15 first part of the edges
16 edge stiffener
17 first surface of edge stiffener
18 inner side of first shell body parts
19 second surface of edge stiffener
20 inner side of second shell body parts
21 root region
22 airfoil region
23 transition region
24 fibre-reinforced material of edge stiffener
25 core part/material of edge stiffener
26 fibre protrusions of edge stiffener
26a connecting part/wall for 26
27 tower
28 nacelle
29 blade tip 30 blade root
31 root area
32 transition area
33 airfoil area
34 chord length
35 airfoil thickness
37 camber line
37 glue
38 airfoil profile
40 balsa wood or foamed polymer of the shells
41 edge part of the edge stiffener
42 third surface of the edge stiffener
43 fibre reinforcement

The invention claimed is:

1. A wind turbine blade for a rotor of a wind turbine having a horizontal rotor shaft, the rotor comprising a hub from which the wind turbine blade extends in a radial direction when mounted to the hub, wherein the wind turbine blade comprises:
   a profiled contour comprising a pressure side and a suction side, a leading edge and a trailing edge with a chord extending between the leading edge and the trailing edge, the profiled contour generating a lift when being impacted by an incident airflow,
   wherein the profiled contour is formed by a hollow shell body,
   wherein the hollow shell body is formed by at least a pressure side shell body part and a suction side shell body part, which are mutually connected at least at the trailing edge, such that the pressure side shell part and the suction side shell part form the hollow shell body, characterised in that an elongated, longitudinally extending and prefabricated edge stiffener is arranged within the hollow shell body adjacent the trailing edge, the elongated, longitudinally extending and prefabricated edge stiffener comprising:
   a first part with a core material with fibre material wrapped around the core material so as to surround the core material and being arranged adjacent the trailing edge, the first part being tapered in a direction towards the trailing edge; and
   a second part being C- or U-shaped and comprising protrusions made of a fibre material which extend from the first part in a direction away from said one of the trailing edge or leading edge,
   wherein a first longitudinal surface part of the elongated, longitudinally extending and prefabricated edge stiffener is connected to an inner side of the pressure side shell body part, and a second longitudinal surface part of the elongated, longitudinally extending and prefabricated edge stiffener is connected to an inner side of the suction side shell body part.

2. The wind turbine blade according to claim 1, wherein the first part of the edges comprises at least a part of the trailing edge.

3. The wind turbine blade according to claim 1, wherein the first part of the edges comprises at least a part of the leading edge.

4. The wind turbine blade according to claim 1, wherein the elongated, longitudinally extending and prefabricated edge stiffener is formed of a single continuous piece or alternatively of a number of longitudinally and adjacently arranged modules.

5. The wind turbine blade according to claim 1, wherein the elongated, longitudinally extending and prefabricated edge stiffener comprises a part made of core wrapped in fibre-reinforced material and a longitudinally adjacent part made of fibre-reinforced material only closest to a tip.

6. The wind turbine blade according to claim 1, wherein the length of the elongated, longitudinally extending and prefabricated edge stiffener is at least 5 meters.

7. The wind turbine blade according to claim 6, wherein the length of the elongated, longitudinally extending and prefabricated edge stiffener is at least 5-15 meters.

8. The wind turbine blade according to claim 7, wherein the length of the elongated, longitudinally extending and prefabricated edge stiffener is at least 7-12 meters.

9. The wind turbine blade according to claim 8, wherein the length of the elongated, longitudinally extending and prefabricated edge stiffener is at least 8-10 meters.

10. The wind turbine blade according to claim 1, wherein the cross-sectional area of the elongated, longitudinally extending and prefabricated edge stiffener decreases in radial direction of the blade.

11. The wind turbine blade according to claim 1, wherein the mass ratio between the fibre material and core material varies in radial direction of the blade.

12. The wind turbine blade according to claim 1, wherein the outer contour of the elongated, longitudinally extending and prefabricated edge stiffener is congruent with the inner contour of the hollow shell body and the edge, at which the elongated, longitudinally extending and prefabricated edge stiffener is placed and to which it is bonded.

13. The wind turbine blade according to claim 1, wherein the profiled contour is divided in the radial direction into a root region with a circular or elliptical profile closest to the hub and an airfoil region with a lift generating profile furthest away from the hub.

14. The wind turbine blade according to claim 13, wherein the profiled contour further includes a transition region between the root region and the airfoil region, the transition region having a profile changing gradually in the radial direction from the circular or elliptical profile of the root region to the lift generating profile of the airfoil region.

15. The wind turbine blade according to claim 1, wherein the elongated, longitudinally extending and prefabricated edge stiffener is placed in at least a part of the transition region of the blade and at least part of the airfoil region of the blades.

16. The wind turbine blade according to claim 1, wherein the fibre-reinforced material is glass fibre.

17. The wind turbine blade according to claim 1, wherein the core material is foamed polymer or balsa wood.

18. A method of manufacturing a wind turbine blade provided with an elongated, longitudinally extending and prefabricated edge stiffener comprising a first part with a core material with fibre material wrapped around the core material so as to surround the core material and being arranged adjacent a trailing edge, the first part being tapered in a direction towards the trailing edge, and a second part being C- or U-shaped and comprising protrusions made of a fibre material which extend from the first part in a direction away from the trailing edge,
   wherein the method comprises the steps of
   i) arranging the elongated, longitudinally extending and prefabricated edge stiffener adjacent the trailing edge of a hollow shell body of the wind turbine blade,
   ii) providing said edge with a binder, and
   iii) applying a force to the elongated, longitudinally extending and prefabricated edge stiffener during curing of the binder and pressing the elongated, longitudinally extending and prefabricated edge stiffener towards the trailing edge and an inner wall side of the hollow shell body.

19. The method according to claim 18, wherein the blade is manufactured by the following manufacturing steps:
   a) providing a first shell part being a pressure side shell part,
   b) providing a second shell part being a suction side shell part,
   c) assembling the hollow shell body by connecting the first shell part to the second shell part,
   d) connecting a first surface of the elongated, longitudinally extending and prefabricated edge stiffener to an inner part of the first shell part, and
   e) connecting a second surface of the elongated, longitudinally extending and prefabricated edge stiffener to an inner part of the second shell part.

20. The method according to claim 18, wherein the binder is glue.

\* \* \* \* \*